(12) United States Patent
Nathan et al.

(10) Patent No.: US 10,038,712 B2
(45) Date of Patent: Jul. 31, 2018

(54) METHOD AND APPARATUS FOR DYNAMIC DETECTION OF GEO-LOCATION OBFUSCATION IN CLIENT-SERVER CONNECTIONS THROUGH AN IP TUNNEL

(71) Applicant: PayPal, Inc., San Jose, CA (US)

(72) Inventors: Avihay Nathan, San Jose, CA (US); Uri Arad, San Jose, CA (US); Oded Argon, San Jose, CA (US); David Stein, San Jose, CA (US); Lev Faivishevsky, San Jose, CA (US); Roi Lupo, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 288 days.

(21) Appl. No.: 14/727,556

(22) Filed: Jun. 1, 2015

(65) Prior Publication Data

US 2015/0350160 A1    Dec. 3, 2015

Related U.S. Application Data

(60) Provisional application No. 62/006,691, filed on Jun. 2, 2014.

(51) Int. Cl.
| | |
|---|---|
| *H04L 29/06* | (2006.01) |
| *H04L 29/08* | (2006.01) |
| *H04L 12/805* | (2013.01) |
| *H04L 12/26* | (2006.01) |

(52) U.S. Cl.
CPC .......... *H04L 63/1441* (2013.01); *H04L 47/36* (2013.01); *H04L 63/14* (2013.01); *H04L 67/18* (2013.01); *H04L 43/0864* (2013.01); *H04L 43/16* (2013.01)

(58) Field of Classification Search
CPC ..... H04L 47/36; H04L 63/1441; H04L 63/14; H04L 67/18; H04L 43/16; H04L 43/0864
See application file for complete search history.

(56) References Cited

U.S. PATENT DOCUMENTS

| | | | | |
|---|---|---|---|---|
| 7,305,464 | B2* | 12/2007 | Phillipi | .................. H04L 29/06 709/223 |
| 2003/0009571 | A1* | 1/2003 | Bavadekar | .......... H04L 12/4633 709/230 |
| 2003/0079041 | A1* | 4/2003 | Parrella, Sr. | ...... G06F 17/30902 709/247 |
| 2003/0079121 | A1* | 4/2003 | Gilman | ............... H04L 12/4641 713/153 |

(Continued)

*Primary Examiner* — Abu Sholeman
(74) *Attorney, Agent, or Firm* — Haynes and Boone, LLP

(57) ABSTRACT

Methods and systems are disclosed for dynamic detection of fraudulent client connections to a server, in which, for example, the connection is made using an internet protocol (IP) tunneling technology such as networking on a virtual private network (VPN) and making the connection via a VPN tunnel in order to obfuscate the client IP address, in which a user of a client device may employ spoofing of IP-geo location mechanisms and IP classification on the server side. Such a user may have various motivations for obfuscating the client device's geo-location by using an IP tunnel when connecting to a server such as gaining access to services that are not allowed in certain locations (e.g., certain movie and television content providers); browsing server data while maintaining a higher level of anonymity; and performing fraudulent actions on the server.

10 Claims, 6 Drawing Sheets

(56) References Cited

U.S. PATENT DOCUMENTS

| | | | | |
|---|---|---|---|---|
| 2007/0064610 A1* | 3/2007 | Khandani | ............... | H04L 47/10 370/235 |
| 2008/0189788 A1* | 8/2008 | Bahl | ................... | G06F 21/577 726/25 |
| 2009/0193513 A1* | 7/2009 | Agarwal | ............. | H04L 63/0227 726/15 |
| 2010/0322249 A1* | 12/2010 | Thathapudi | ............. | H04L 47/10 370/395.1 |
| 2012/0321052 A1* | 12/2012 | Morrill | ............. | H04L 29/06027 379/32.01 |
| 2014/0143308 A1* | 5/2014 | Tychina | ................. | H04L 69/16 709/203 |
| 2015/0074810 A1* | 3/2015 | Saher | ................ | H04L 63/1466 726/23 |
| 2016/0044054 A1* | 2/2016 | Stiansen | ............. | H04L 63/1416 726/24 |

* cited by examiner

METHOD AND APPARATUS FOR DYNAMIC DETECTION OF GEO-LOCATION OBFUSCATION IN CLIENT-SERVER CONNECTIONS THROUGH AN IP TUNNEL

CROSS REFERENCE TO RELATED APPLICATIONS

This application claims benefit of priority of U.S. Provisional Patent Application No. 62/006,691, filed Jun. 2, 2014, which is hereby incorporated by reference in its entirety.

BACKGROUND

Technical Field

The present disclosure generally relates to electronic commerce and, more particularly, relates to methods and systems for dynamic detection of geo-location obfuscation in client-server connections through an IP tunnel.

Related Art

An IP (Internet Protocol) tunnel may be described as an IP network communications channel between two networks. An IP tunnel may be used to transport packets of another network protocol by encapsulating the packets of the other protocol using IP. IP tunnels are often used for connecting two disjoint IP networks that don't have a native routing path to each other, via an underlying routable protocol across an intermediate transport network. In conjunction with the IPsec protocol suite IP tunnels may be used to create a virtual private network (VPN) between two or more private networks across a public network such as the Internet. Another use for IP tunnels is to connect islands of IPv6 installations across the IPv4 Internet.

A user of a client device may have various motivations for obfuscating the client device's geo-location by using an IP tunnel when connecting to a server. In a typical scenario, a client user might like to obfuscate the client's true internet protocol (IP) address from the server for purposes of privacy and anonymity, and may, thus, employ spoofing of IP-geo location mechanisms and IP classification on the server side. The client user's motivations may include, for example, 1) gaining access to services that are not allowed in certain locations (e.g., certain movie and television content providers); 2) browsing server data while maintaining a higher level of anonymity; and 3) performing fraudulent actions on the server, as the obfuscating IP address may allow for spoofing of risk geo-location and IP classification mechanisms on the server side.

An IP tunnel can provide a means of evading detection by legacy (e.g., conventional) IP obfuscation detection mechanisms, which provide detection of HTTP/HTTPS/TCP proxies. Such conventional detection may be achieved by establishing a direct transmission control protocol (TCP) connection between the client and the server which is relayed by the tunnel service.

Commercial solutions for IP tunneling detection rely heavily on static lists of IP addresses which are known to belong to IP tunneling providers or malware bots, or are openly published in underground forums. Collecting these lists is done by data mining and extraction techniques. The accuracy and coverage rely on the quality and the update frequency of the static lists, and deteriorate over time.

The included drawings are for illustrative purposes and serve only to provide examples of possible systems and methods for the disclosed methods and system for providing detailed, prompt consumer ratings feedback to merchants and also providing information useable in real time back to the consumer. These drawings in no way limit any changes in form and detail that may be made to that which is disclosed by one skilled in the art without departing from the spirit and scope of this disclosure.

DETAILED DESCRIPTION

The present disclosure describes methods and systems for dynamic detection of fraudulent client connections to a server, in which, for example, the connection is made using an internet protocol (IP) tunneling technology such as networking on a virtual private network (VPN) and making the connection via a VPN tunnel in order to obfuscate the client IP address.

In one embodiment, fraudulent geo-location obfuscation using IP tunneling techniques (such as VPN tunneling) may be detected dynamically while a client is making a connection to a server.

In one embodiment, a method for dynamic detection of fraudulent geo-location obfuscation of client connections to a server can rely solely on dynamic detection (e.g., while a client is making a connection to a server as opposed to static detection methods using, for example, static lists of IP addresses which are known to belong to IP tunneling providers, malware bots, openly published in underground forums, or collected using data mining and extraction techniques).

In one or more embodiments, the method can be stateless—in the sense that it does not use techniques, such as stateful firewalls, that keep track of the state of a network connection for maintaining the connection—and may work from the second connection made from a particular IP address (even before the particular IP address may be published as a known IP address of an IP tunnel).

In one or more embodiments, the method may offer an end product which relates to the risk of the current connection from the client being fraudulent, rather than simply estimating the probability of connection through an IP tunnel. Such risk assessment may take into account the fact that connection through an IP tunnel may be legitimate as well as fraudulent.

Figure 1:
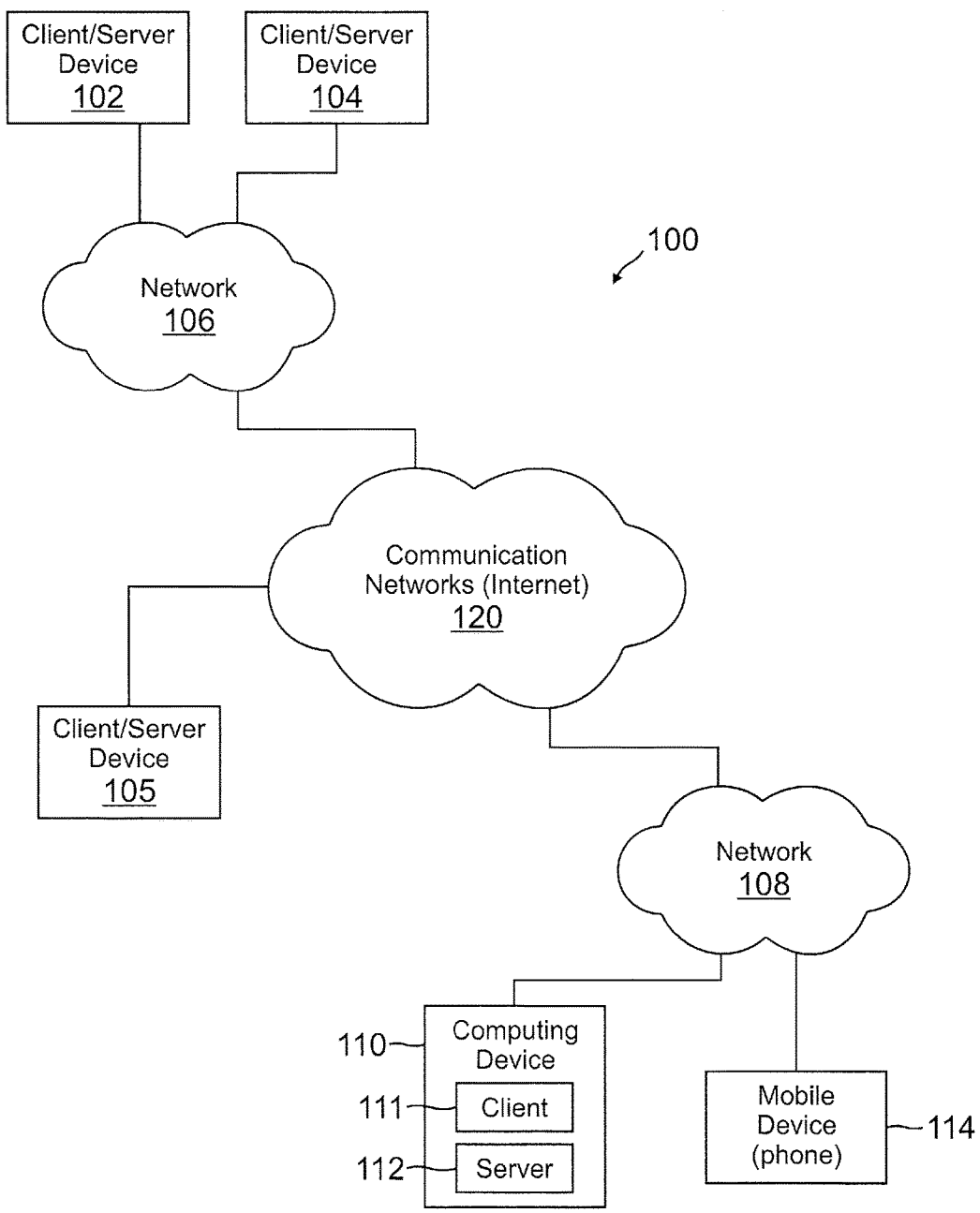
FIG. 1 is a system block diagram of a communications network in which dynamic detection of fraudulent client connections to a server may be implemented, according to an embodiment.

As seen in FIG. 1, an IP tunnel may be implemented as an IP network communications channel between two networks, such as network 106 and network 108. An IP tunnel may be used to transport packets of one network protocol (e.g., one native to networks 106, 108) by encapsulating the packets of the first protocol (e.g., the one native to networks 106, 108) using internet protocol (IP) as shown, for example, in FIG. 2, and sending the encapsulated packets across an intervening network, such as Internet 120 as seen in FIG. 1. IP tunnels are often used for connecting two disjoint IP networks (e.g., networks 106, 108) that don't have a native routing path to each other, via an underlying routable protocol (e.g., IP in this example illustrated by FIG. 1) across an intermediate transport network (e.g., Internet 120 in this example illustrated by FIG. 1). In conjunction with the IPsec protocol suite, IP tunnels may be used to create a virtual private network (VPN) between two or more private networks (e.g., networks 106, 108 in this example illustrated by FIG. 1) across a public network such as the Internet. An IP or VPN tunnel may be used to connect any of client/server devices 102, 104, 105, computing device 110 (executing either a client 111 or server 112, or mobile device 114 (e.g., a smartphone or tablet) operating as a client, for example, with any other of the devices 102, 104, 105, or 110, which may operate as a server.

Figure 2:
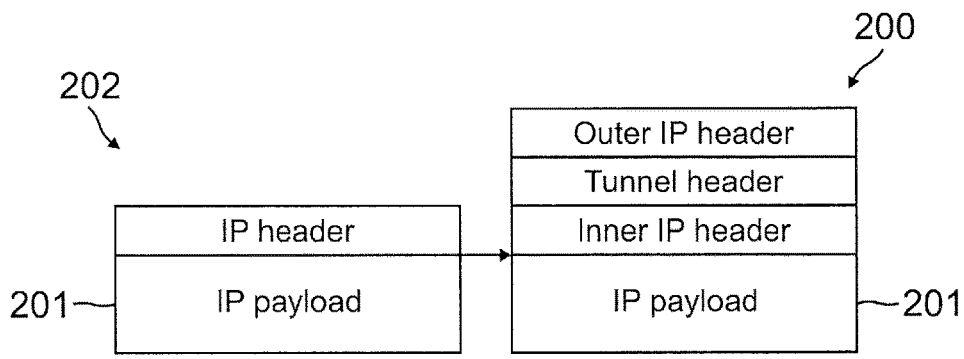
FIG. 2 is a schematic diagram of network communication packets showing an example of IP tunneling encapsulation, in accordance with an embodiment.

FIG. 2 illustrates an example of IP tunneling encapsulation 200. In IP tunneling, any IP packet (e.g., an IP datagram 202), including its payload 201 and addressing information of its source and destination IP networks (inner IP header), may be encapsulated within another packet format (outer IP header) native to the transit network (Internet in the example illustrated by FIG. 1).

Figure 3:
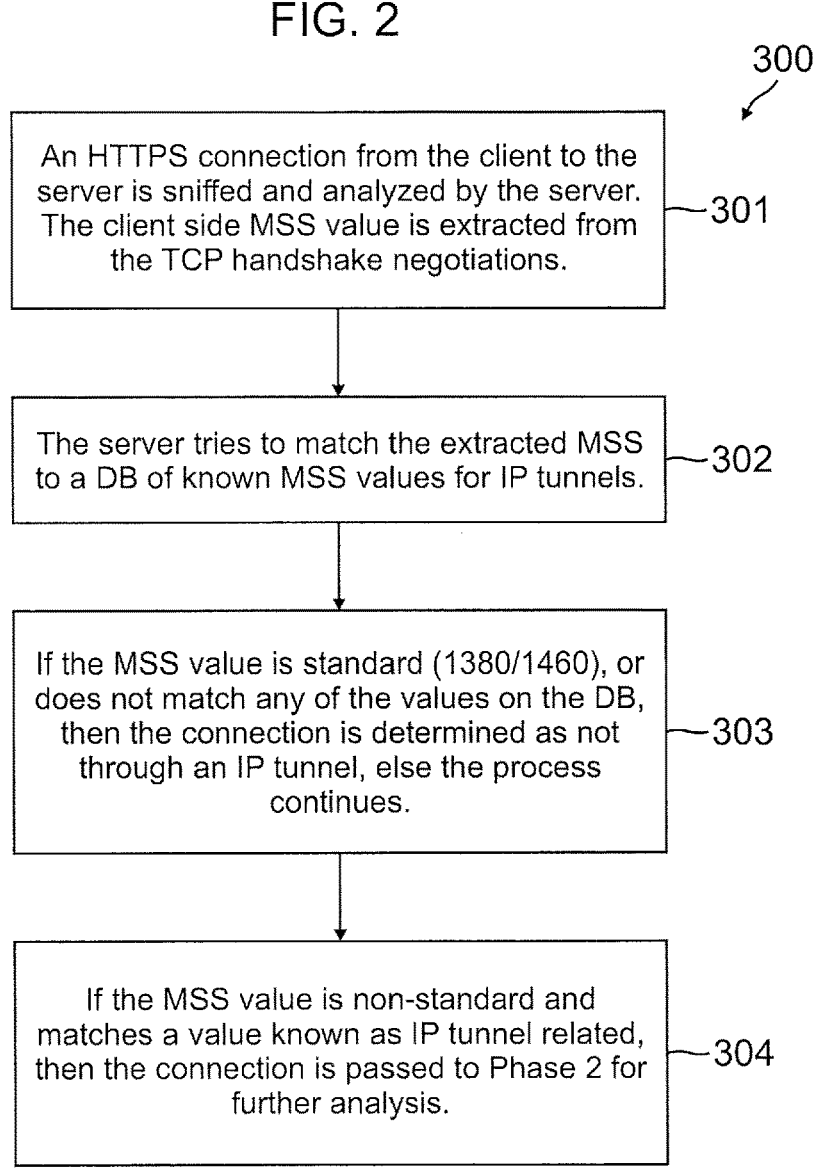
FIG. 3 is a flow chart of one phase of a method for dynamic detection of geo-location obfuscation in client-server connections through an IP tunnel, according to an embodiment.

Referring to FIG. 3, a method 300 for a first phase of dynamic detection of geo-location obfuscation in client-server connections through an IP tunnel may include processes 301, 302, 303, and 304, for example.

In process 301, an HTTPS connection from the client to the server is sniffed and analyzed by the server. The client side maximum segment size (MSS) value (a networking parameter stored in the TCP/IP stack, for example) may be extracted from the TCP handshake negotiations.

In process 302, the server tries to match the extracted MSS to a database (e.g., database 511 shown in FIG. 5) of known MSS values for IP tunnels.

In process 303, if the MSS value is standard (1380/1460), or does not match any of the values on the database, then the connection is determined as not through an IP tunnel, else the process continues.

In process 304, if the MSS value is non-standard and matches a value known as IP tunnel related—as described in an example provided below—then the connection is passed to a second phase for further analysis.

The first phase of dynamic detection of geo-location obfuscation is focused on determining whether the client is connecting to the server while using an IP tunnel. The determination is performed by means of payload size fingerprinting.

In computer networking, the maximum transmission unit (MTU) of a communications protocol of a layer is the size (in bytes) of the largest protocol data unit that the layer can pass onwards. MTU parameters usually appear in association with a communications interface (e.g., network interface card (NIC), serial port). Standards (e.g., Ethernet) can fix the size of an MTU or systems (e.g., point-to-point serial links) may decide MTU at connect time.

A larger MTU brings greater efficiency because each packet carries more user data while protocol overheads, such as headers or underlying per-packet delays, remain fixed; the resulting higher efficiency means a slight improvement in bulk protocol throughput. A larger MTU also means processing of fewer packets for the same amount of data.

MTU is divided into overhead and payload. For example: for TCP/IPv4 over Ethernet MTU is 1518 Bytes (B) for the Internet, comprising overhead and payload—overhead: 18 B for Ethernet; 20 B for IP; 20 B for TCP, and payload: 1460.

Various IP tunneling technologies used by the client will require extra protocol overhead, for means of session management and data encryption. Therefore the usage of tunneling protocols reduces the payload size in the Ethernet frame, from 1460 to an unknown figure.

The server will dynamically estimate the new payload size in data frames sent by the client by the use of another networking parameter in the TCP/IP stack, called maximum segment size (MSS).

The MSS is a parameter of the TCP protocol that specifies the largest amount of data that a computer or communications device can receive in a single TCP segment, and therefore in a single IP datagram. The MSS limit applies to the total amount of data contained in the final, reconstructed TCP segment. Therefore, for the Ethernet example given above: Headers+MSS=MTU, numerically (18+20+20+1460=1518).

Since the MTU for Ethernet is constant, a different set of networking headers other than the standard will result in a different figure for the MSS (other than 1460).

Various IP tunneling technologies will result in different sets of tunneling headers which have different sizes, thus effectively changing the MSS parameter.

For example, usage of OpenVPN IP tunneling will result in an MSS value of 1367, and usage of PPTP IP tunneling will result in an MSS value of 1356. A database of MSS values, IP tunnel types, and clients may be maintained, e.g., database 511 shown in FIG. 5.

The server is able to retrieve from the database the MSS value for each client during the TCP handshakes. For most computer users, the MSS option is established by the operating system on the SYN packet during the TCP handshake.

Figure 4:
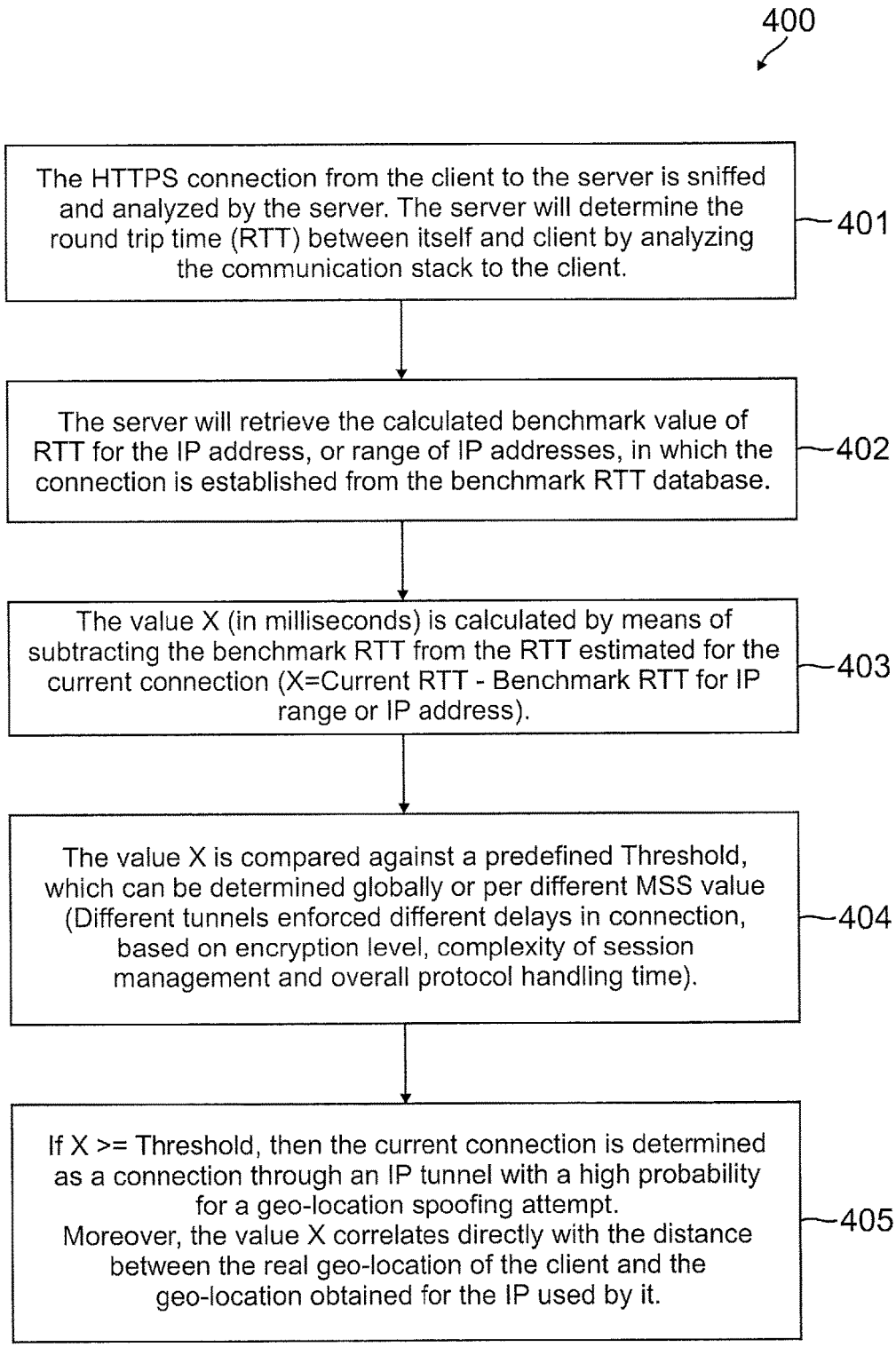
FIG. 4 is a flow chart of another phase of a method for dynamic detection of geo-location obfuscation in client-server connections through an IP tunnel, according to an embodiment.

Referring to FIG. 4, a method 400 for a second phase of dynamic detection of geo-location obfuscation in client-server connections through an IP tunnel may include processes 401, 402, 403, 404, and 405, for example.

In process 401, the HTTPS connection from the client to the server is sniffed and analyzed by the server. The server will determine the round trip time (RTT) of the connection between itself and the client by analysis of the communication stack of the connection to the client. For example, the server may determine the round trip time (RTT) of the connection by analyzing the key exchange protocol performed as part of the Transport Layer Security (TLS) protocol (mandatory requirement when using HTTPS).

Figure 5:
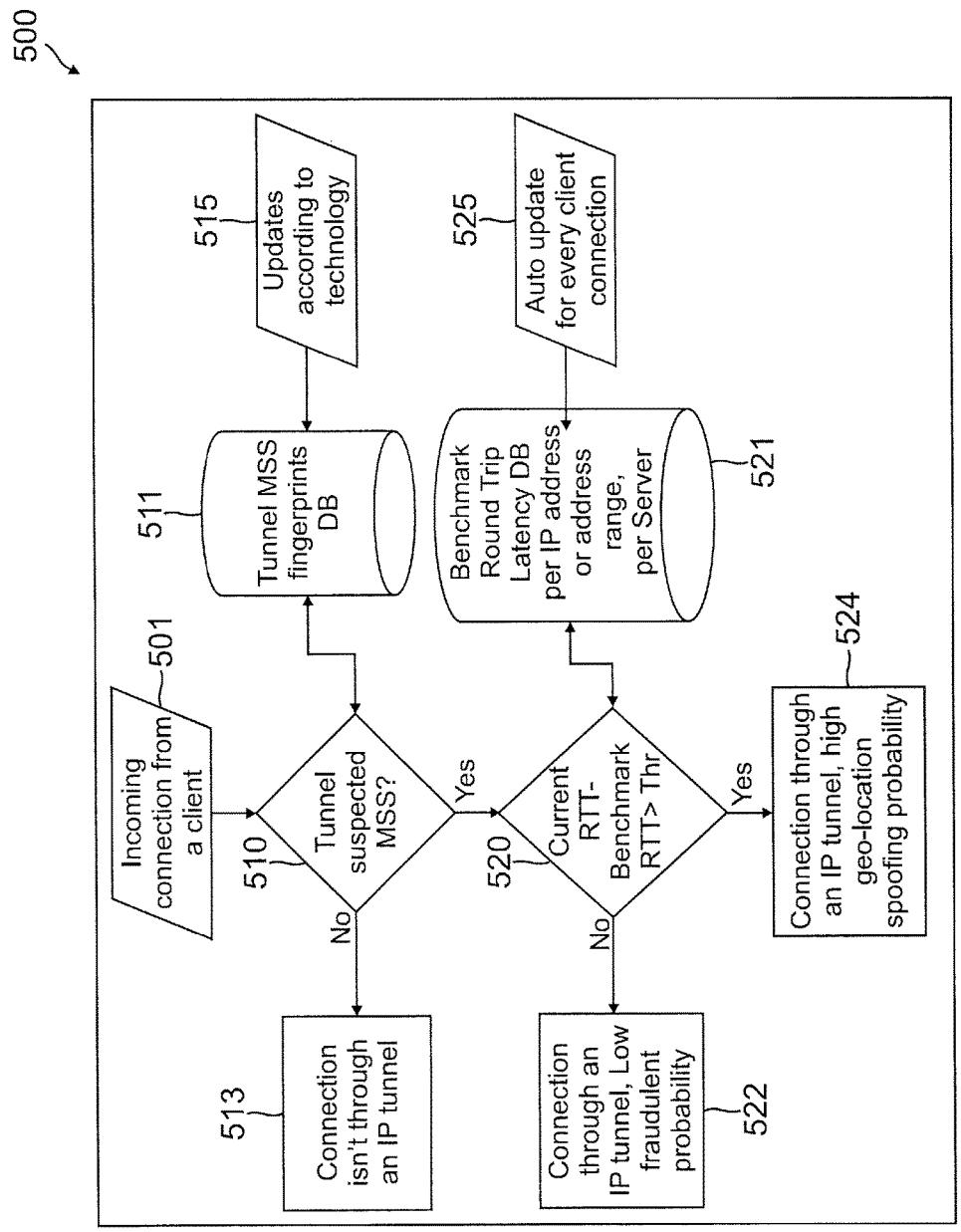
FIG. 5 is a flow chart of a method for dynamic detection of geo-location obfuscation in client-server connections through an IP tunnel, according to an embodiment.

In process 402, the server will retrieve the benchmark value of RTT for the internet protocol in which the connection is established from a benchmark RTT database (e.g., database 521 shown in FIG. 5). Such a benchmark value of RTT for the internet protocol and address or address range in which the connection is established may be calculated, for example, as an average of minimal or minimum round trip times for addresses in a range containing the address from which a connection is being made.

In process 403, the value X (in milliseconds) is calculated by means of subtracting the benchmark RTT from the RTT estimated for the current connection (X=current RTT−benchmark RTT for IP address range containing the current address, for example). The value X may correspond, for example, to the network latency described above.

In process 404, the value X is compared against a predefined threshold, which can be determined globally for each different MSS value (for example, different tunnels may enforce different delays in connection, based on encryption level, complexity of session management, and overall protocol handling time).

In process 405, if X>=threshold, then the current connection is determined as a connection through an IP tunnel with a high probability for a geo-location spoofing attempt. Moreover, the value X correlates directly with the distance between the real (or actual) geo-location of the client and the geo-location obtained for the internet protocol used by the client.

The second phase of the dynamic detection of geo-location obfuscation method is focused on 1) determining the round trip time (RTT) between the client and the server for the current connection (e.g., connection 501 shown in FIG. 5); and 2) what is the difference between that time and the historical benchmark RTT between the server and the IP address the client connects from.

In telecommunications, the round-trip delay time (RTD) or round-trip time (RTT) is the length of time it takes for a signal to be sent plus the length of time it takes for an acknowledgment of that signal to be received. This time delay therefore consists of the propagation times of a signal between the two points.

In the context of computer networks, the signal is generally a data packet (e.g. a datagram, also referred to more succinctly as "packet"), and the RTT is also known as the ping time. An internet user can determine the RTT by using the ping command; in the current method, however, the server cannot ping each and every client due to the fact that many clients block incoming ping requests, and the server side resources required for pinging each and every client may limit the method scalability.

In the dynamic detection of geo-location obfuscation method, the server will able to measure the current RTT for the client connection, dynamically and in real time, by forcing the client to connect via HTTPS protocol. The usage of HTTPS implies the usage of TLS protocol for means of connection encryption. The TLS protocol allows for a cypher exchange between the client and the server, and the connection's RTT can be estimated by server side sniffing of (e.g., intercepting and reading selected information from) the datagrams used in the key exchange process.

In order to obtain the historical or benchmark RTT, the server repeats the measurement operation described above for each and every client connection. The data is processed and persisted in the server database (e.g., database 521 shown in FIG. 5) per client internet protocol. If the internet protocol for the client connection already exists in the database, then the lowest RTT measurement may be persisted, therefore creating a benchmark database using the minimum RTT measurement per internet protocol. The minimum RTT from a server to an IP address may represent the optimal routing known between the server and an IP address, and may be used as a benchmark. Such a benchmark may, in addition, be refined according to other considerations, such as averaging statistical data, as described above.

Upon obtaining the figures (e.g., best available values) for current RTT and benchmark RTT for internet protocol, subtracting the historical benchmark RTT from the current RTT creates a new figure X. X (in milliseconds) may be calculated by means of subtracting the benchmark RTT from the RTT estimated for the current connection (X=current RTT−benchmark RTT for internet protocol).

X can represent the delay (or excess round trip time), in milliseconds, between the current connection, and the "best internet routing" possible between the server and a given IP address.

The probability for an IP geo-location spoof attempt in the connection is highly correlative with the difference between X and a threshold (X minus threshold). The threshold can be estimated or modeled from historical data, for example, so that a pre-defined threshold may be used. Thus a risk or a "geo-location spoofing" score for an IP tunneled connection can be calculated and consumed by models running on the server or on various decision support systems.

The "delay" threshold can be calculated or trained with the current data on the server or by simulating the method on historical data and optimizing values to maximize catch and hit rate of tagged fraudulent connections. The threshold may be global, or various specific thresholds may be defined per MSS value.

FIG. 5 is a flow chart of a method 500 for dynamic detection of geo-location obfuscation in client-server connections through an IP tunnel, according to an embodiment. Method 500 may include a process 510 of evaluating, based on a maximum segment size (MSS) parameter of a packet of a client connection (e.g., incoming connection 501 from a client) to the server (e.g., a processor on which method 500 may be executing or operating), whether the connection 501 is made via tunneling. Process 510 may include some or all of method 300, for example. Process 510 may perform operations that include accessing (e.g., reading from or writing to) a database such as database 511. Database 511 may be an IP tunneling maximum segment size (MSS) fingerprints database. Database 511 may provide a data source which contains various MSS values which have been identified as related to IP tunnels. Inserting values (e.g., updates 515) into the database 511 may be done only after analyzing the effect of different tunnel technology and protocol options on the theoretical MSS value, and then verifying in field testing. Process 510 may determine that connection 501 is most likely not made through a tunnel (e.g., via tunneling) and provide a risk assessment 513 of low geo-location or "spoofing" risk because the connection is not made via tunneling. Alternatively, process 510 may determine that connection 501 most likely is made through a tunnel and pass operation of method 500 to process 520.

In an example in which a virtual private networking tunneling analysis was performed in accordance with an embodiment, e.g., process 510 or first phase method 300, using raw networking data, results were obtained showing, for each of several MSS values, percentage of network traffic via VPN tunneling vs. percentage of general network traffic. For example, for an MSS value of 1300, the analysis showed that about 20.9% of network traffic is via VPN tunneling and only 0.07% is general network traffic (network traffic not occurring over a VPN tunnel). The same analysis showed that MSS values 1300, 1332, 1336, 1367, 1368, and 1369, for example, may be most likely to be suspect for VPN tunneling and subject to further phase 2 latency analysis, e.g., analysis in accordance with process 520 or second phase method 400. (Network latency, or more briefly, latency, may be regarded as the difference in round trip time (RTT) for a packet on a current connection to a particular IP address and a benchmark RTT based on historical data for the particular IP address. Thus, latency is always greater than zero, but too large a value may indicate a distant connection using the particular IP address.) By keeping track of such non-standard, or IP tunnel-related or suspect MSS values in a database, database 511 for example, the database may be accessed for matching a current MSS value with an MSS value known as IP tunnel related, as described at step 304 of method 300.

Method 500 may include a process 520 of estimating a risk of geo-location obfuscation associated with the client connection 501 to the server, based on a latency analysis of the connection when the connection is made via tunneling as determined, for example, by process 510. Process 520 may include some or all of method 400, for example. Process 520 may perform operations that include accessing (e.g., reading from or writing to) a database such as database 521. Database 521 may be a database of benchmark round trip times (RTT) between the server and an IP client that relates RTT network latency to protocols and servers by protocol and by server. Database 521 may provide a data source which contains a value in milliseconds which represents the benchmark (e.g., a minimum or average of minimal round trip times) round trip calculated in all previous connections between the server and an IP address (e.g., database 521 may relate benchmark round trip times to connections between each server and each IP address in a group of servers and IP addresses). Database 521 can be updated (e.g., auto-update 525) in any time interval (even dynamically) by the server, following any connection 501 from a client (including connections not made through a tunnel as well as connections suspected of IP tunneling). Process 520 may provide risk assessments 522, 524 of whether the client connection 501 to the server is made via tunneling so as to obfuscate the geo-location of a client making the client connection to the server. Process 520 may provide a risk assessment 522 of low fraudulent probability or "spoofing" risk based on the value X=Current RTT−Benchmark RTT being less than a pre-defined threshold. Likewise, process 520 may provide a risk assessment 524 of high fraudulent probability or "spoofing" risk based on the value X=Current RTT−Benchmark RTT not being less than (greater or equal to) the pre-defined threshold.

If risk assessment 524 of process 520 (alternatively, process 304 or process 405) indicates a high fraudulent probability or "spoofing" risk, a device that is executing method 500 (alternatively, method 300 or method 400)—such as a server 112 executing on computing device 110 (see FIG. 1)—may take some non-routine action such as to terminate the connection 501 or deny future connections from the particular client making connection 501 for some determinate length of time.

In an example in which a virtual private networking tunneling analysis was performed in accordance with an embodiment, e.g., process 520 or second phase method 400, using raw networking data including MSS data and RTT data for client-server connections, results were obtained showing, for each of several MSS values, a percentage of the number of connections correctly identified with regard to tunneling and geo-location as being of either a fraudulent nature (e.g., connection made via VPN tunnel from a location distant from a proxy server) or legitimate in nature (e.g., connection made via VPN tunnel from a location near to the proxy server). In one example, for packets having MSS value of 1360, applying the method described and illustrated by FIG. 5 achieved an accuracy of 96%, e.g., 96 percent of connections were correctly identified with regard to tunneling and geo-location as being of either a fraudulent nature or legitimate in nature.

Figure 6:
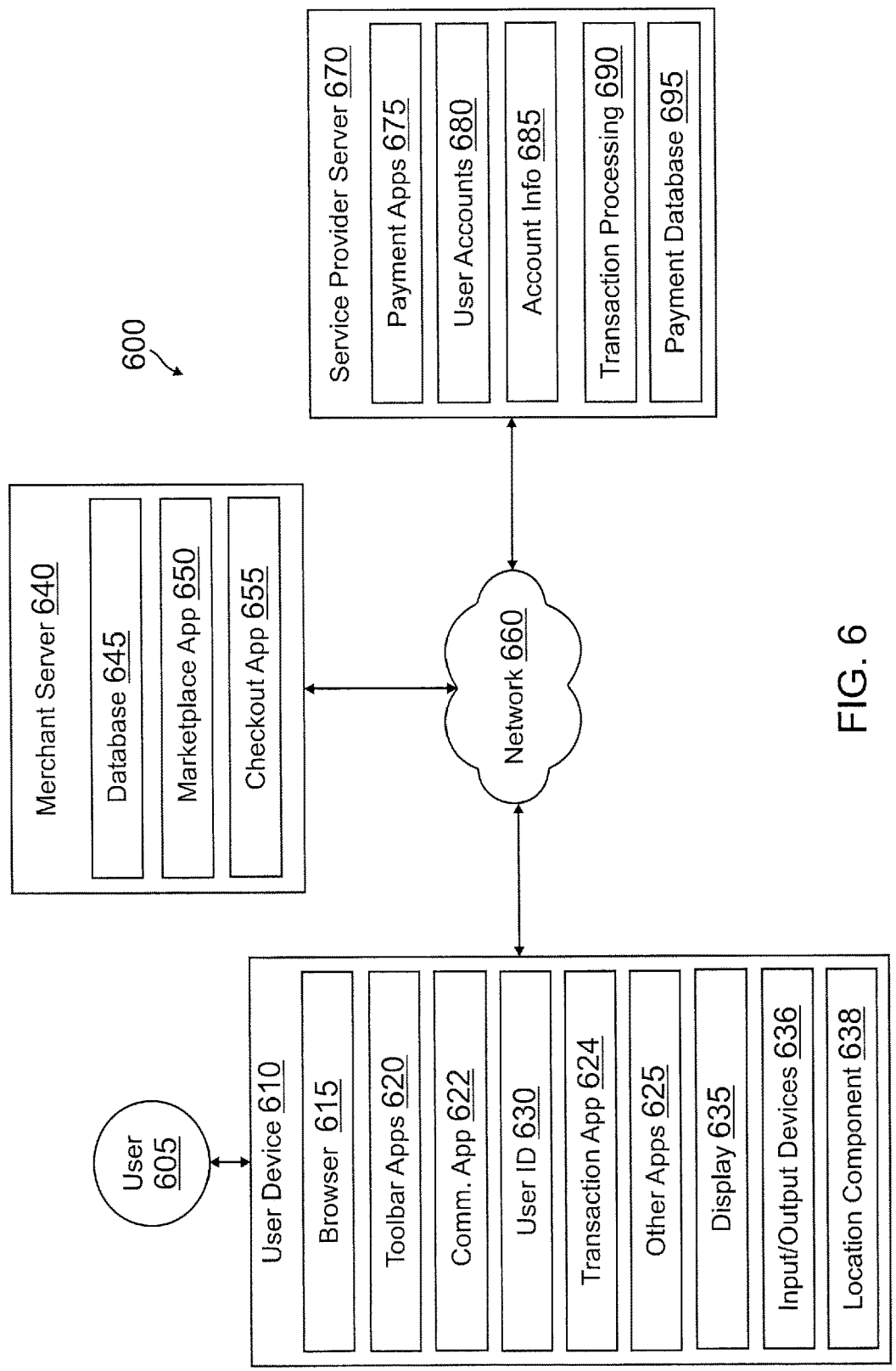
FIG. 6 is a system diagram illustrating a networked system for updates and update notifications and warnings, in accordance with one or more embodiments.

FIG. 6, is a system block diagram of a networked system 600 suitable for implementing a geo-location obfuscation detection system according to an embodiment. Networked system 600 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

System 600 may include a user device 610, a merchant server 640, and a service provider server 670 in communication over a network 660. Service provider server 670 may be maintained by a payment service provider, such as PayPal, Inc. of San Jose, Calif. A user 605, such as a sender or consumer, may utilize user device 610 to perform a transaction such as an electronic commerce transaction using service provider server 670. A user 605 may utilize user device 610 to initiate a payment transaction, receive a transaction approval request, or reply to the request. Note that transaction, as used herein, refers to any suitable action performed using the user device, including payments, transfer of information, display of information, purchases, sales, online listings, etc. For example, user 605 may utilize user device 610 to initiate a deposit into a savings account. Although only one merchant server is shown, a plurality of merchant servers may be utilized if the user is purchasing products or services from multiple merchants.

User device 610, merchant server 640, and service provider server 670 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

User device 610 may be implemented using any appropriate hardware and software configured for wired and/or wireless communication over network 660. For example, in one embodiment, user device 610 may be implemented as a personal computer (PC), a smart phone, personal digital assistant (PDA), laptop computer, tablet computer, wristwatch with appropriate computer hardware resources, eyeglasses with appropriate computer hardware (e.g. Google Glass®), other type of wearable computing device, and/or other types of computing devices capable of transmitting and/or receiving data, such as an iPad® from Apple®. Although a user device is shown, the user device may be managed or controlled by any suitable processing device. Although only one user device is shown, a plurality of user devices may function similarly.

User device 610 may include one or more browser applications 615 which may be used, for example, to provide a convenient interface to permit user 605 to browse information available over network 660. For example, in one embodiment, browser application 615 may be implemented as a web browser configured to view information available over the Internet, such as a user account for setting up a shopping list and/or merchant sites for viewing and purchasing products and services. User device 610 may also include one or more toolbar applications 620 which may be used, for example, to provide client-side processing for performing desired tasks in response to operations selected by user 605. In one embodiment, toolbar application 620 may display a user interface in connection with browser application 615.

User device 610 may include a transaction application 624. Transaction application 624 may be used to receive product information, price information, merchant information or other information from service provider server 670 and/or merchant server 640. Transaction application 624 may provide transaction information such as items for sale and/or payment options to display 635 for display to a user.

Transaction application 624 may receive device location information and/or device orientation information from location components 638 (e.g., a global positioning system (GPS) component, one or more accelerometers, a compass, Wi-Fi devices, Near-Field Communication (NFC) devices, etc.). The location information may include GPS coordinates, accelerometer data that indicates an orientation of the device and/or movement of the device or other data that indicates the location, position, and/or orientation of the device. User device 610 may determine a current location of user device 610 based on the collected location data. In another embodiment, user device 610 may send the location data to service provider server 670 and service provider server 670 may determine a current location of user device 610 based on the location data. The transaction information displayed by display 635 in response to instructions from transaction application 624 may include content that is based on the location information and/or may be displayed at a time or at a location on display 635 based on the location information.

User device 610 may include one or more input/output devices 636 (e.g., a keypad, a keyboard, a touch sensitive component, or a camera). For example, input/output devices 636 may include a camera that provides images of background objects (e.g., a continuous video stream of a scene in the field of view of the camera) to transaction application 624 that can be displayed on display 635 with transaction information overlaid on the camera images.

User device 610 may further include other applications 625 as may be desired in particular embodiments to provide desired features to user device 610. For example, other applications 625 may include security applications for implementing client-side security features, programmatic client applications for interfacing with appropriate application programming interfaces (APIs) over network 660, or other types of applications.

Applications 625 may also include email, texting, voice and IM applications that allow user 605 to send and receive emails, calls, and texts through network 660, as well as applications that enable the user to communicate, transfer information, make payments, and otherwise utilize a smart wallet through the service provider as discussed above. User device 610 may include one or more user identifiers 630 which may be implemented, for example, as operating system registry entries, cookies associated with browser application 615, identifiers associated with hardware of user device 610, or other appropriate identifiers, such as used for payment/user/device authentication. In one embodiment, user identifier 630 may be used by a payment service provider to associate user 605 with a particular account maintained by the service provider. A communications application 622, with associated interfaces, enables user device 610 to communicate within system 600.

Display 635 may include a touch screen that displays information to user 605 and receives user input from user 605 or display 635 may be a touch insensitive display. Display 635 may be a mobile device display, a projection display that projects images onto a transparent, partially transparent or opaque structure, or may include any other suitable display technology. User device 610 may monitor user input on the touch screen, on any other touch-sensitive device (e.g., a touchpad on a laptop), or using other input components (e.g., a mouse) and may recognize user input for association with transactions, and/or to activate certain functions (e.g., purchase transactions, payment transactions, sales transactions, and listing transactions) based on the displayed transaction information.

Merchant server 640 may be maintained, for example, by a merchant or seller offering various products and/or services. The merchant may have a physical point-of-sale (POS) store front. The merchant may be a participating merchant who has a merchant account with the payment service provider. Merchant server 640 may be used for POS or online purchases and transactions. Generally, merchant server 640 may be maintained by anyone or any entity that receives money, which includes charities as well as banks and retailers. For example, a payment may be a donation to charity or a deposit to a bank account such as a savings account.

Merchant server 640 may include a database 645 identifying available products (including digital goods) and/or services (e.g., collectively referred to as items) which may be made available for viewing and purchase by user 605. Accordingly, merchant server 640 also may include a marketplace application 650 which may be configured to serve information over network 660 to browser 615 of user device 610. In one embodiment, user 605 may interact with marketplace application 650 through browser applications over network 660 in order to view various products, food items, or services identified in database 645.

Merchant server 640 also may include a checkout application 655 which may be configured to facilitate the purchase by user 605 of goods or services online or at a physical POS or store front. Checkout application 655 may be configured to accept payment information from or on behalf of user 605 through payment service provider server 670 over network 660. For example, checkout application 655 may receive and process a payment confirmation from payment service provider server 670, as well as transmit transaction information to the service provider and receive information from the service provider (e.g., a transaction ID). Checkout application 655 may be configured to receive payment via a plurality of payment methods including cash, credit cards, debit cards, checks, money orders, or the like.

Service provider server 670 may be maintained, for example, by an online payment service provider which may provide payment between user 605 and the operator of merchant server 640. In this regard, service provider server 670 includes one or more payment applications 675 which may be configured to interact with user device 610 and/or merchant server 640 over network 660 to facilitate the purchase of goods or services, communicate/display information, and send payments by user 605 of user device 610.

Service provider server 670 also maintains a plurality of user accounts 680, each of which may include account information 685 associated with consumers, merchants, and funding sources, such as banks or credit card companies. For example, account information 685 may include private financial information of users of devices such as account numbers, passwords, device identifiers, user names, phone numbers, credit card information, bank information, or other financial information which may be used to facilitate online transactions by user 605. Payment application 675 may be configured to interact with merchant server 640 on behalf of user 605 during a transaction with checkout application 655 to track and manage purchases made by users and which and when funding sources are used. Payment application 675 may be configured to determine the existence of and to manage accounts for user 605, as well as create new accounts if necessary. Payment application 675 may be configured to execute one or more payment transactions in response to receiving and recognizing a drawn pattern from user 605.

A transaction processing application 690, which may be part of payment application 675 or may be separate from application 675, may be configured to receive information from user device 610 and/or merchant server 640 for processing and storage in a payment database 695. Transaction processing application 690 may include one or more applications for processing information from user 605 for processing an order and for payment using various selected funding instruments, including operations for initial purchase and for payment after purchase as described herein. As such, transaction processing application 690 may store details of an order from individual users, including a funding source used, available credit options, etc. Transaction processing application 690 may be configured to execute one or more transactions such as electronic commerce transactions in response to selection of a transaction option in a transaction display from user 605.

One or more of merchant server 640, service provider server 670, and user device 610 may be used to execute any suitable transaction in response to receiving transaction instructions from a user 605.

Figure 7:
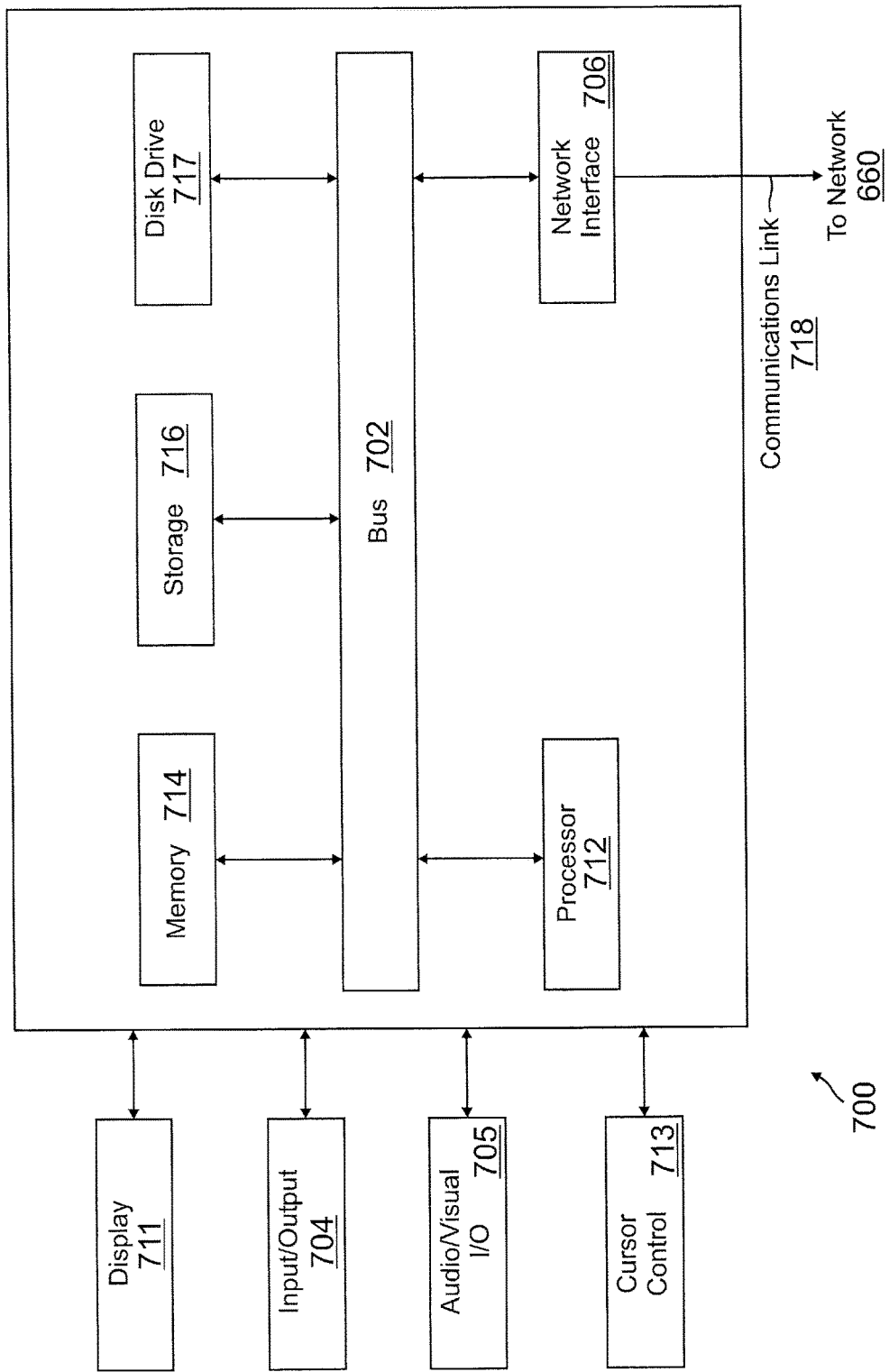
FIG. 7 is a block diagram of an example of a computer system suitable for implementing on one or more devices of the networked system in FIG. 6, according to an embodiment.

FIG. 7 is a block diagram of an example of a computer system 700 suitable for implementing on one or more devices of the networked system in FIG. 6, according to one or more embodiments. In various implementations, the user device may comprise a personal computing device (e.g., smart phone, a computing tablet, a personal computer, laptop, PDA, Bluetooth device, key FOB, badge, etc.) capable of communicating with the network. The merchant and/or service provider may utilize a network computing device (e.g., a network server) capable of communicating with the network. It should be appreciated that each of the devices utilized by users, merchants, and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, a merchant server, or a service provider server via network 160. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for dynamically detecting geo-location obfuscation of a client connection between a client and a server, the method comprising:
   forcing, by the server, the client connection to use an HTTPS protocol;
   extracting a maximum segment size (MSS) parameter of a packet associated with TCP handshake negotiations of the HTTPS protocol;
   evaluating, based on comparing a value of the MSS parameter to a database of known MSS values for connections made via tunneling, whether the client connection is made via tunneling;
   estimating a risk of geo-location obfuscation associated with the client connection based on a latency analysis of the client connection when the evaluation indicates the client connection is made via tunneling; and
   providing a risk assessment, according to the evaluation of whether the client connection is made via tunneling and the estimation of risk, of whether the client connection is made via tunneling so as to obfuscate the geo-location of the client.

2. The method of claim 1, wherein the evaluation further comprises:
   determining that the client connection is not made via tunneling when the value of the MSS parameter of the packet is either a standard value or does not match any value in the database of known MSS values for connections made via tunneling.

3. The method of claim 1, wherein the estimation further comprises:
   determining a round trip time (RTT) between the server and the client by analyzing a communication stack of the client connection.

4. The method of claim 1, wherein the estimation further comprises:
   retrieving a benchmark RTT, from a second database that relates protocols to benchmark RTT, for a protocol in which the client connection is made.

5. A system comprising:
   a server processor; and
   a data storage device including a non-transitory computer-readable medium having computer readable code for instructing the server processor that, when executed by the server processor, causes the server processor to perform operations comprising:
   forcing a client to use an HTTPS protocol to make a connection to the server processor;
   extracting a client side maximum segment size (MSS) value from TCP handshake negotiations of the HTTPS protocol;
   evaluating, based on comparing the client side MSS value to a database of known MSS values for connections made via tunneling, whether the connection is made via tunneling;
   estimating a risk of geo-location obfuscation associated with the connection to the server processor, based on a latency analysis of the connection when the evaluation indicates the connection is made via tunneling;
   providing a risk assessment, according to the estimation of risk-and the evaluation, of whether the connection is made via tunneling so as to obfuscate a geo-location of the client; and
   terminating the connection in response to the evaluation indicating the connection is made via tunneling.

6. The system of claim 5, wherein the evaluation further comprises:
   determining that the connection is not made via tunneling when a value of the client side MSS value is either a standard value or does not match any value in the database.

7. The system of claim 5, wherein the estimation further comprises:
   determining a round trip time (RTT) between the server processor and the client by analysis of a communication stack of the client connection.

8. The system of claim 5, wherein the operations further comprise:
   denying a future connection for some determinate length of time from the client.

9. A non-transitory computer-readable medium comprising instructions which, in response to execution by a computer system, cause the computer system to:
   force a client to use an HTTPS protocol when making a client connection to the computer system;
   extract a maximum segment size (MSS) parameter from TCP handshake negotiations of the HTTPS protocol;
   determine a match between the MSS parameter and a database of known MSS values for connections made via tunneling, wherein the match indicates that the client connection is made via tunneling;
   estimate a risk of geo-location obfuscation associated with the client connection, based on a latency analysis of the client connection when the match indicates that the client connection is made via tunneling;
   provide a risk assessment, according to the estimation of risk and the match, of whether the client connection is made via tunneling so as to obfuscate a geo-location of the client; and
   terminate the client connection in response to determining the match.

10. The non-transitory computer-readable medium of claim 9, further comprising instructions which, in response to execution by a computer system, cause the computer system to:
    determine a round trip time (RTT) between the computer system and the client by analyzing a communication stack of the client connection.

* * * * *